Sept. 27, 1949.  S. C. MACK  2,482,786
THREAD CUTTING MACHINE
Filed July 9, 1945  2 Sheets-Sheet 1

INVENTOR
STANLEY C. MACK
BY Hyde and Meyer
ATTORNEYS.

Sept. 27, 1949.	S. C. MACK	2,482,786
THREAD CUTTING MACHINE
Filed July 9, 1945	2 Sheets-Sheet 2
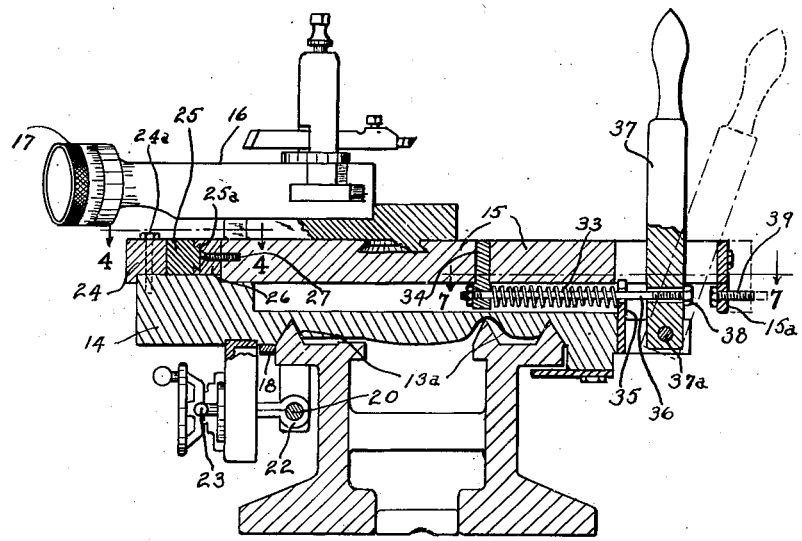
FIG. 3.
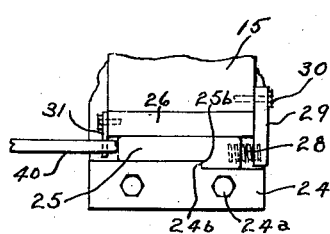
FIG. 4.
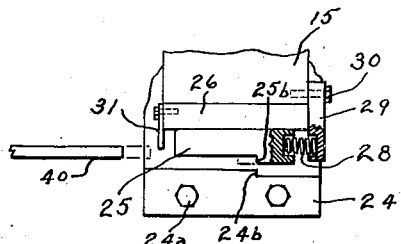
FIG. 5.
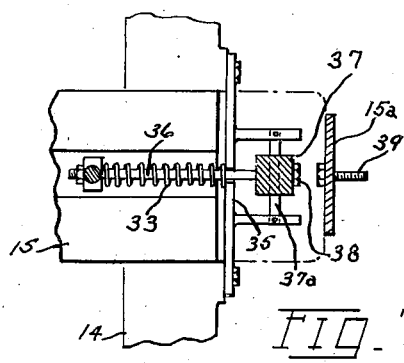
FIG. 7.
FIG. 6.
INVENTOR
STANLEY C. MACK
By Hyde and Meyer
ATTORNEYS.

Patented Sept. 27, 1949

2,482,786

UNITED STATES PATENT OFFICE 2,482,786

THREAD-CUTTING MACHINE

Stanley C. Mack, Cleveland, Ohio, assignor to Merit Machine Company, Northfield, Ohio, a corporation of Ohio Application July 9, 1945, Serial No. 603,819

2 Claims. (Cl. 82—5)

This invention relates to improvements in a lathe attachment which is particularly useful in the cutting of threads.

One of the objects of the present invention is to provide means associated with the tool rest of a lathe or the like adapted to hold the tool into engagement with the work up to a predetermined point at which time the tool is suddenly moved away from the work so as to end a tool cut exactly at a predetermined point. It is possible with this device to make progressively deeper cuts and to withdraw the tool at exactly the same point every time and to thereby produce a result not heretofore possible to my knowledge.

Another object of the present invention is to provide a device as described above together with means for resetting the device after each cut by means of a very simple manual operation.

Other objects and advantages of the invention are disclosed in the particular arrangement of coacting parts which are clearly set forth in the accompanying drawings and described in the specification, and the essential features of which will be summarized in the appended claims.

In the drawings,

Fig. 3 is a transverse sectional view further enlarged and taken along the line 3—3 of Fig. 2;

Figure 1:
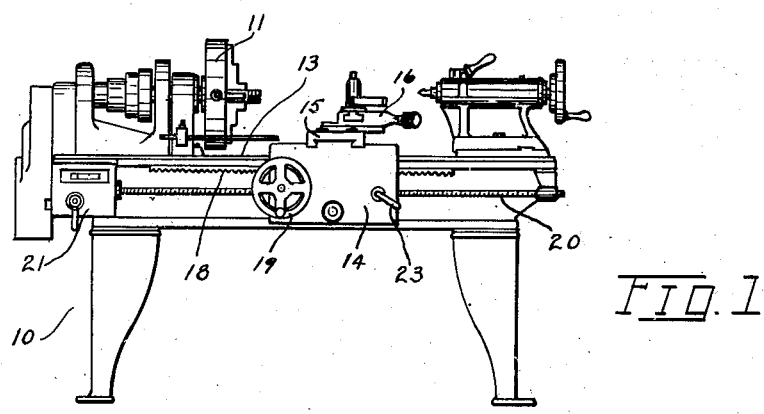
Fig. 1 is a side elevational view of a lathe equipped with my device.
Figure 2:
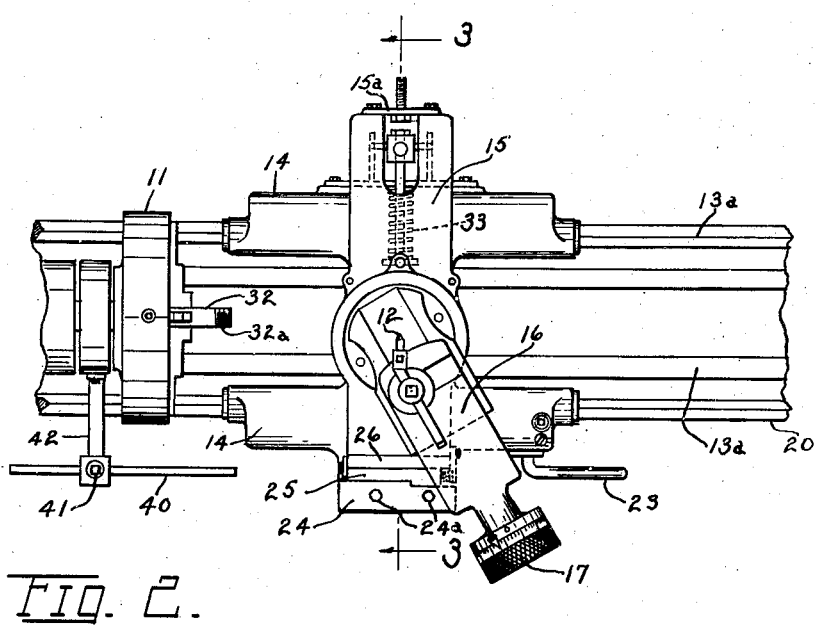
Fig. 2 is a top plan view, enlarged, of a portion of the lathe of Fig. 1.

Figs. 4, 5, and 6 are fragmental plan views taken near the central bottom portion of Fig. 2 and generally along the line indicated at 4—4 of Fig. 3; while Fig. 7 is a fragmental sectional view taken along the line 7—7 of Fig. 3.

I have chosen to illustrate my invention as applied to a lathe known by the trade name of "South Bend," although it will be understood by those skilled in the art that my invention has other applications and is not limited solely to the device shown. In making certain cuts on a work piece rotatably mounted in the head 11 of the lathe 10, it is sometimes desirable to move the cutting tool 12 along a cut lengthwise of the work piece, which cut is required to be stopped at a predetermined point. It is almost impossible to manually withdraw the tool 12 away from the work piece at the end of such a cut and do this at the same point when progressively deeper cuts are made. I have provided very simple apparatus for accomplishing this result. I believe this apparatus may be used to make straight cuts up to a shoulder, but I have found it particularly useful in cutting a thread which is required to end at a certain point, and I shall describe my invention as applied to such a device.

The lathe 10 is provided with a bed 13 having the usual ways 13a along which travels a carriage or saddle 14 lengthwise of the bed. On this carriage is mounted a cross slide 15 which as here shown is a compound slide of known type. The usual screw for moving the slide 15 and control hand wheel therefor has been removed and other parts substituted therefor as will presently appear. Mounted on the slide is the tool rest 16 which carries the cutting tool 12. The depth of cut is regulated by the knurled wheel 17 in the usual manner. The carriage 14 is moved along the lathe bed toward and away from the work by the usual rack 18 and a pinion (not shown) controlled by the hand wheel 19, as is usual. For thread cutting, the usual lead screw 20 is provided rotated by means (not shown) connected with the gear box 21. The carriage 14 is locked to the lead screw by a split nut 22 controlled by the handle 23 in the usual manner.

My improved means for controlling the position of the cutting tool 12 comprises a pair of coacting abutments 24 and 25 which in one relative position hold the tool nearer the work piece and in another position permit the tool to move farther away from the work piece. The abutment 24 is fastened to the carriage 14 by means of the cap screws 24a. The abutment 25, as clearly shown in Fig. 3, has a dovetail connection 25a with a block 26 which is fastened to the slide 15 by means of the screws 27. In this manner the abutment 25 is mounted on the slide 15 for sliding movement generally parallel to the longitudinal dimension of the lathe bed 13. At the right-hand end of the abutment 25, as viewed in Figs. 2, 4, 5, and 6, is provided a small compression spring 28 which is held between the end of the abutment 25 and a bracket 29 which is fastened to the slide 15 by the cap screw 30. Small recesses in the parts 25 and 29 hold the spring 28 in place. The movement of abutment 25 toward the left (as viewed in these same figs.) may be limited, if desired, by means of the stop member 31 fastened to the block 26.

For controlling a thread cutting operation or for cutting up to a sharp shoulder, I provide the form of abutment shown in Figs. 2, 4, 5, and 6 wherein sharp shoulders 25b and 24b are provided on the respective abutments, these shoulders extending substantially at right angles to the long dimension of the lathe bed. With this arrangement, when the shoulder portions are lapping, as shown in Fig. 6, the slide 15 is held toward the top of the sheet as viewed in Fig. 2, that is, in a position to hold the tool 12 nearer the work piece 32 which is mounted in this case in a chuck in the headstock. When these shoulder portions are in the full line position of Figs. 2, 4, and 5, it is then possible for the slide 15 to move farther toward the bottom of the sheet, as viewed in Fig. 2, or in a direction to cause the tool 12 to move away from the work piece 32.

The slide 15 is held as far toward the abutment 24 as possible at all times during a cutting operation by means of spring 33, best seen in Figs. 2, 3, and 7. This spring is held between bracket 34 on the slide 15 and bracket 35 on the carriage 14. The spring surrounds the link 36 which is connected between bracket 34 and the lower end of handle 37 which is pivotally connected to the bracket 35 at the point 37a. The link 36 is adjustable by means of the nut 38, and the stroke of handle 37 may be limited, if desired, by means of the adjusting screw 39 carried by plate 15a bolted to the rear end of the slide 15.

It results from the above-described construction that the spring 33 normally urges the slide 15 toward the left, as viewed in Fig. 3, or toward the bottom of the sheet, as viewed in Fig. 2. If the tool 12 is cutting a thread on the work piece 32 from right to left, as viewed in Fig. 2, the abutments 24 and 25 are placed in the relative position of Fig. 6 by moving the handle 37 from the full line position of Fig. 3 to the dot-dash line thereof which moves the slide 15 to the position shown in Fig. 5. This carries the block 26 and the abutment 25 to a position where the shoulders 25b and 24b are clear of each other, as shown in Fig. 5. At this time, the spring 28 will move the abutment 25 from the full line position of Fig. 5 to the dot-dash position there shown against the stop 31. If the carriage 14 is now locked to the lead screw 20, by manipulation of the handle 23 the tool 12 will be carried from right to left to cut the thread 32a on the end of the work piece 32.

Means is provided to cause the tool 12 to jump out of the work suddenly when it has reached the end of the thread-cutting operation. This means comprises a stop 40 adjustably mounted by set screw 41 in a bracket 42 fixed to an immovable portion of the lathe. The end of stop 40 is positioned opposite the left end of abutment 25 as viewed in Figs. 2, 4, 5, and 6 and in a different plane from the stop pin 31. It results from this construction that if the stop 40 is properly positioned with respect to the thread-cutting operation at 32a, it will engage the end of abutment 25 as carriage 14 moves toward the left (Fig. 2) holding the abutment 25 stationary while the abutment 24 continues to travel in the same direction as previously. This causes the relative position of abutments 25 and 24 to change from that shown in Fig. 6 to a position where the shoulders 25b and 24b are in registration at which time the spring 33 causes these abutments to nest together, as shown in Fig. 4, which causes the tool 12 to jump suddenly out of the work piece 32.

While I have shown my device used to control a cut made in one direction along the length of the lathe bed, it will be obvious to those skilled in this art how the same may be applied to control a cut made in the opposite direction. Likewise, while I have described the cutting of a thread, it is obvious that by properly regulating the tool 12 and the feed applied thereto that a smooth cut might be made up to a predetermined point where the stop 40 would cause the tool to jump away from the workpiece. Other uses for my invention will be readily apparent to those skilled in this art.

What I claim is:

1. Support means for a lathe tool comprising a carriage movable along the lathe bed, a two-part slide mounted on said carriage for movement transversely of the lathe bed, said slide having a movable part and a relatively fixed part, a tool carried by said movable slide part, a spring between said slide parts urging said movable part in one direction to move said tool away from a work piece, two coacting abutments limiting movement of said movable slide part in said one direction, one of said abutments being mounted on said fixed slide part, the second of said abutments being mounted adjacent the first named abutment and on said movable slide part for movement generally longitudinally of the lathe bed, said abutments having a single pair of coacting sharp shoulders extending transversely of the lathe bed, said abutments having one relative position where said shoulders overlap to hold said tool nearer the work piece, said abutments having another relative position where said shoulders nest to permit said tool to move farther from the work piece under the influence of said spring, and means fixed relative to said lathe bed adapted to engage said second abutment as said carriage moves along said bed in such a manner as to cause relative movement of said abutments from overlapping position to nesting position.

2. Support means for a lathe tool comprising a carriage movable along the lathe bed, a two-part slide mounted on said carriage for movement transversely of the lathe bed, said slide having a movable part and a relatively fixed part, a tool carried by said movable slide part, a spring between said slide parts urging said movable part in one direction to move said tool away from a work piece, two coacting abutments limiting movement of said movable slide part in said one direction, one of said abutments being mounted on said fixed slide part, the second of said abutments being mounted adjacent the first named abutment and on said movable slide part for movement generally longitudinally of the lathe bed, said abutments having sharp shoulders extending transversely of the lathe bed, said abutments having one relative position where said shoulders overlap to hold said tool nearer the work piece, said abutments having another relative position where said shoulders nest to permit said tool to move farther from the work piece under the influence of said spring, means fixed relative to said lathe bed adapted to engage said second abutment as said carriage move along said bed in such a manner as to cause relative movement of said abutments from overlapping position to nesting position, a spring urging said second abutment toward said overlapping position, said second named spring being so constructed and arranged that it is loaded upon engagement of said second abutment by said fixed means, and means for moving said movable slide part in the other direction against the force of said first named spring to separate said shoulders and to permit said second named spring to act.

STANLEY C. MACK.

REFERENCES CITED

The following references are of record in the file of this patent:

UNITED STATES PATENTS

| Number | Name | Date |
| --- | --- | --- |
| 2,002,933 | Buell | May 28, 1935 |
| 2,364,241 | Pedersen | Dec. 5, 1944 |